(12) United States Patent
Dohi

(10) Patent No.: US 12,147,830 B2
(45) Date of Patent: Nov. 19, 2024

(54) SYSTEM INCLUDING DEVICE AND INFORMATION PROCESSING APPARATUS IN WHICH APPLICATION CAPABLE OF CHANGING SETTING OF THE DEVICE OPERATES

(71) Applicant: CANON KABUSHIKI KAISHA, Tokyo (JP)

(72) Inventor: Makoto Dohi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 512 days.

(21) Appl. No.: 17/492,459

(22) Filed: Oct. 1, 2021

(65) Prior Publication Data
US 2022/0116507 A1 Apr. 14, 2022

(30) Foreign Application Priority Data

Oct. 9, 2020 (JP) .................................. 2020-170890

(51) Int. Cl.
*G06F 9/48* (2006.01)
(52) U.S. Cl.
CPC .................................. *G06F 9/485* (2013.01)

(58) Field of Classification Search
CPC .......................... G06F 9/485; H04N 1/00477; H04N 1/00925; H04N 1/4406; H04N 1/00384
See application file for complete search history.

(56) References Cited

U.S. PATENT DOCUMENTS

| 2017/0318072 | A1* | 11/2017 | Borrowman | ............ H04L 67/01 |
| 2017/0366701 | A1* | 12/2017 | Ooba | ................. H04N 1/00076 |
| 2018/0103160 | A1* | 4/2018 | Sugita | ................. H04N 1/00925 |

FOREIGN PATENT DOCUMENTS

JP H07-131451 A 5/1995

* cited by examiner

*Primary Examiner* — Sisley N Kim
(74) *Attorney, Agent, or Firm* — Canon U.S.A., Inc. IP Division

(57) ABSTRACT

A device locks a control panel of the device in response to connection from a device management app of an information processing apparatus. When receiving an operation for releasing the lock via the control panel, the device transmits a notification of stop to the device management app to unlock the control panel. When receiving the notification of stop from the connected device, the device management app of the information processing apparatus stops processing for changing the setting of the device performed by the device management app.

11 Claims, 15 Drawing Sheets

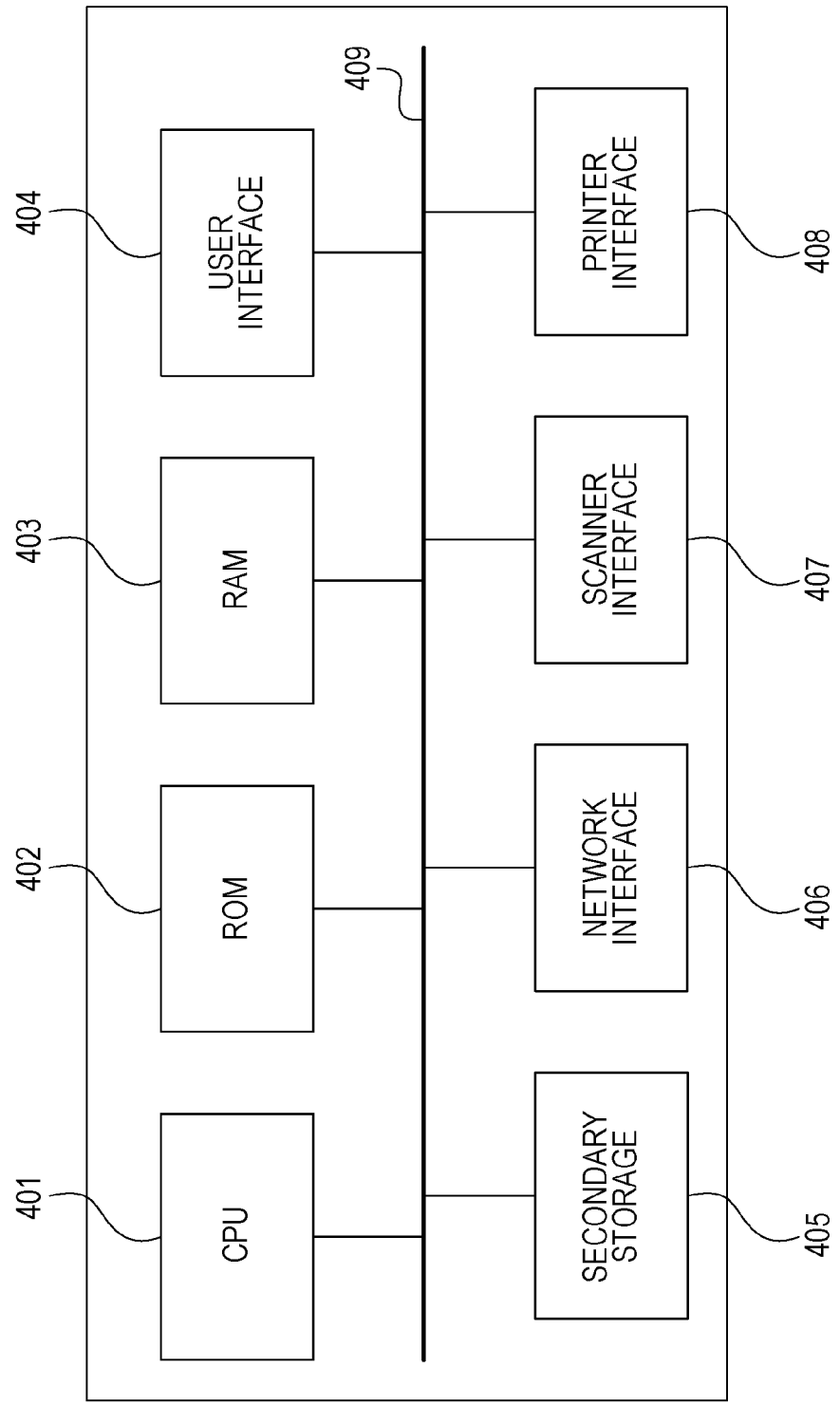

SYSTEM INCLUDING DEVICE AND INFORMATION PROCESSING APPARATUS IN WHICH APPLICATION CAPABLE OF CHANGING SETTING OF THE DEVICE OPERATES

BACKGROUND

Field of the Disclosure

The present disclosure relates to a system including a device and an information processing apparatus in which an application capable of changing the setting of the device operates.

Description of the Related Art

Multifunctional devices (hereinafter referred to as "devices") include multiple functions, for example, for copying images as copying machines, printing print data as printers, transmitting and receiving images, such as documents, as facsimiles. Such a device is normally used by multiple users alternately or at the same time.

For such a device, a management user (hereinafter referred to as "device manager") is present. The device manager connects the device to a network or a telephone line so that the device operates properly or adjusts the setting of the device so that the users can easily use it. Furthermore, the device manager monitors the state of the device, such as whether the setting of the device has been changed by a user for preference. At that time, the device manager often performs the setting of the device or the state monitoring using, for example, an application for managing the device.

While changing the device settings, the device manager may not want other users to operate the device. In such a case, the device manager switches the state of the operation unit of the device so that no user can operate the device (execute the functions, such as copying, or change setting items) via the operation unit of the device.

To disable users from operating the device via the operation unit of the device, as described above, is generally referred to as "lock the operation unit".

To make the operation unit of the device usable again from the locked state is referred to as "unlock the operation unit".

In Japanese Patent Laid-Open No. 7-131451, the operation unit is locked/unlocked by transmitting a message for locking/unlocking the device in a broadcast from a device management application to a network.

In Japanese Patent Laid-Open No. 7-131451, when the operation unit is to be changed from a locked state to an unlocked state, a message for unlocking the device is transmitted in a broadcast to a network from a device management application. This disables the device manager from operating the device directly at a location away from a computer that operates the device management application while continuing the operation of the device management application.

For example, suppose that a device manager moves to a location where the device is installed and tries to operate the device after unlocking the device from a computer that operates the device management application. In this case, another user may operate the (unlocked) device while the device manager is moving toward the device, so that the device manager may not be able to operate the device.

Suppose that the lock of the device is released while an operation on the device is performed using the device management application, so that a similar operation can be performed on the device side. In this case, the device management application is separated, and the device can be operated after the device manager moves to the location where the device is installed. In this case, the fact that the operation is started on the device side by the device manager is not found on the device management application side, which can cause the user on the device management application side to overwrite another setting after the device manager performs an operation on the device side.

In the above case, the operation unit of the device is kept unlocked also after the operation on the device performed by the device manager ends, which enables operations on both of the device side and the device management application side. When the user on the device management application side wants to lock the operation unit of the device again in this state, the device management application has to be restarted, which is troublesome.

SUMMARY

A system according to embodiments of the present disclosure includes a device including an operation unit and an information processing apparatus that executes an application program for changing setting of the device according to an operation of a user The device includes at least one first memory that stores instructions and at least one first processor that executes the instructions to perform restricting an operation via the operation unit in response to connection from the application program and transmitting a first notification, to the application program, for stopping processing for changing the setting of the device according to the application program and withdrawing the restriction when receiving an operation for withdrawing the restriction via the operation unit. The information processing apparatus includes at least one second memory that stores the application program and at least one second processor that executes the application program to perform controlling connection to the device and stopping the processing for changing the setting of the device according to the application program when receiving the first notification from the device.

Further features of the present disclosure will become apparent from the following description of exemplary embodiments with reference to the attached drawings.

BRIEF DESCRIPTION OF THE DRAWINGS

FIG. 4A is a diagram illustrating an example of the hardware configuration of the devices.

DESCRIPTION OF THE EMBODIMENTS

First Embodiment

Figure 1:
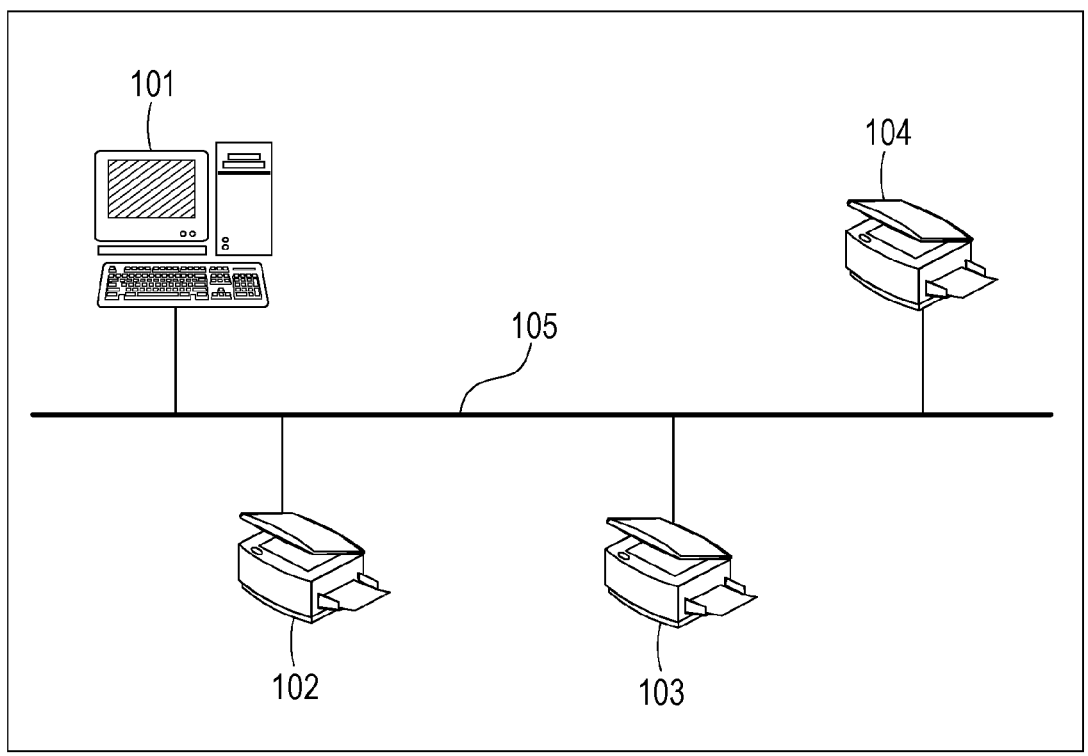
FIG. 1 is a diagram illustrating an example of the overall configuration of a system including devices and a device management application according to an embodiment.

FIG. 1 is a diagram illustrating an example of the overall configuration of a management system including devices and a device management application (hereinafter referred to as "device management app") to which the present disclosure is can be applied.

A server 101 is an information processing apparatus that executes the device management app of this embodiment. Hereinafter, the device management app refers to a device management app executed by (operating in) the server 101 unless otherwise specified. The server 101 may be implemented by a cloud service. The device management app need not be implemented by a server but may be implemented by a personal computer (PC).

Devices 102 to 104 are image forming apparatuses, such as printers or multifunctional peripherals. Various functions of the devices can be used by transmitting a print job from the server 101 or a client PC (not shown) to the devices 102 to 104 for printing.

A network 105 is an intranet, a local area network (LAN), or another network. The server 101 and the devices 102 to 104 are individually communicably connected to the network 105, which can mutually transmit and receive information. The network 105 may be of a wired system or a wireless system, such as Wi-Fi, or may be a public network, such as the Internet, if it is capable of transmitting and receiving information.

In the above systems, device managers can obtain, edit, and distribute information, such as the setting values of the devices 102 to 104, according to user operation using the device management app.

Figure 2:
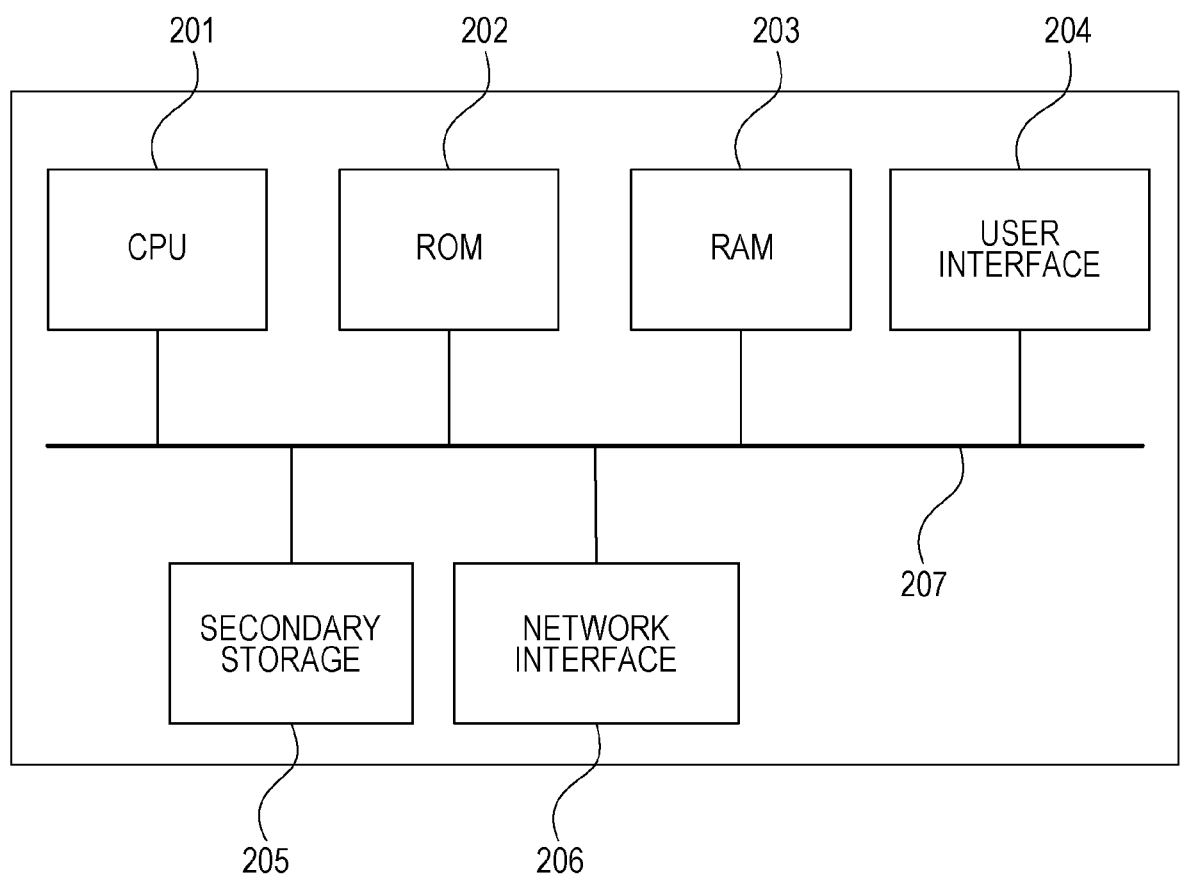
FIG. 2 is a diagram illustrating an example of the hardware configuration of a server.

FIG. 2 is a diagram illustrating an example of the hardware module configuration of the server 101.

A central processing unit (CPU) 201 executes programs read from a read-only memory (ROM) 202, a random-access memory (RAM) 203, and a secondary storage 205 and exchanges data with the CPU 201, the ROM 202, and the secondary storage 205.

The ROM 202 stores programs operating on the server 101 and data.

The RAM 203 provides a temporary memory region.

A user interface 204 inputs and outputs information and signals using a display, a keyboard, a mouse, a touch panel, various keys, a speaker, or the like.

Typical examples of the secondary storage 205 include a hard disk drive (HDD) and a flash memory.

A network interface 206 connects to the network 105, such as a LAN, to communicate with another device to transmit and receive data.

The above components 201 to 206 are connected via an input-output interface 207.

Figure 3:
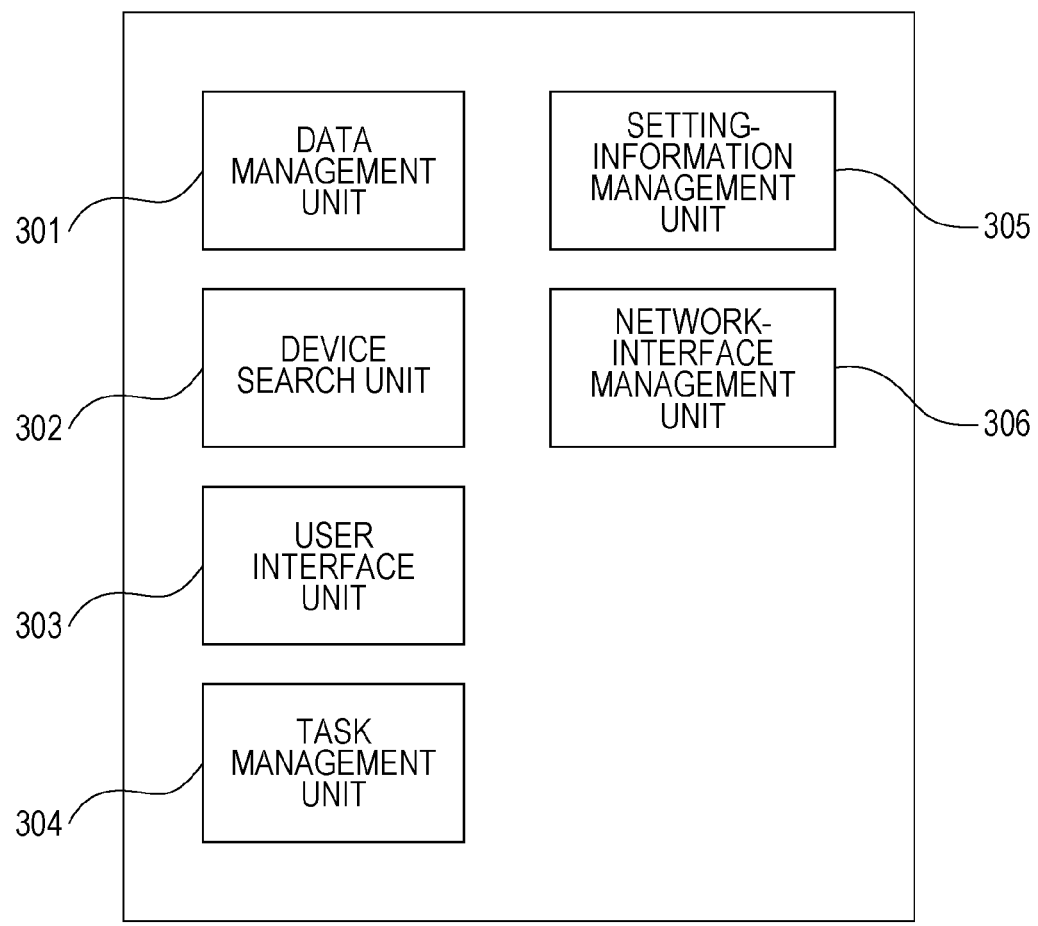
FIG. 3 is a diagram illustrating an example of the software configuration of the device management application.

FIG. 3 is a diagram illustrating an example of the software module configuration of the device management app. The device management app shown in FIG. 3 is implemented by the CPU 201 of the server 101 reading and executing it from the ROM 202 or the secondary storage 205 into the RAM 203.

The software modules of the device management app individually execute the following processes.

A data management unit 301 stores various data groups centered on device setting information managed by the device management app into the secondary storage 205 of the server 101 and manages the data groups in an integrated fashion.

A device search unit 302 determines at any timing whether a device that the device management app can manage is present on the network 105 and stores the determination result in the secondary storage 205 or the RAM 203.

A user interface unit 303 controls the user interface 204 of the server 101 or the like and serves as an interface between the device management app a user who uses the device management app.

A task management unit 304 instructs a setting-information management unit 305 to execute a task according to a schedule set for the task. The task is created by the user who uses the device management app by operating the user interface 204 of the server 101 or the like.

The setting-information management unit 305 obtains setting information, address book information, department management information, or another information from the devices 102 to 104 and transfers the information to the data management unit 301 or conversely extracts the above information from the data management unit 301 and delivers it to the devices 102 to 104.

A network-interface management unit 306 manages and controls the network interface 206 of the server 101 to communicate with the devices 102 to 104 on the network 105. In the following description, the device management app exchanges various pieces of information to and from the devices 102 to 104 via the network 105. The network-interface management unit 306 manages the communication unless otherwise specified.

The device management app further includes other modules (not shown). However, descriptions of modules not used in this embodiment are omitted.

FIG. 4A is a diagram illustrating an example of the hardware module configuration of the devices 102 to 104.

A CPU 401 executes programs read from a ROM 402, a RAM 403, and a secondary storage 405 and exchanges data with the ROM 402, the RAM 403, and the secondary storage 405.

The ROM 402 stores programs operating on each of the devices 102 to 104 and data.

The RAM 403 provides a temporary memory region.

A user interface 404 inputs and outputs information and signals using a control panel (operation unit) in which a keyboard, such as a numerical keypad, a touch panel display, various keys, a speaker, and so on are integrated. An image 700 in FIG. 7, described later, is the control panel. The details will be described later.

Typical examples of the secondary storage 405 include an HDD and a flash memory.

A network interface 406 connects to the network 105, such as a LAN, to communicate with the server 101 or another device to transmit and receive data.

A scanner interface 407 performs communication and transmission and reception of data with a scanner (not shown). The scanner is responsible for processing of reading a document in copying or transmitting a fax.

A printer interface 408 performs communication and transmission and reception of data with a printer (not shown). The printer is used for printing image data sent from the server 101, for example.

The foregoing components 401 to 408 are connected via an input-output interface 409.

Figure 4B:
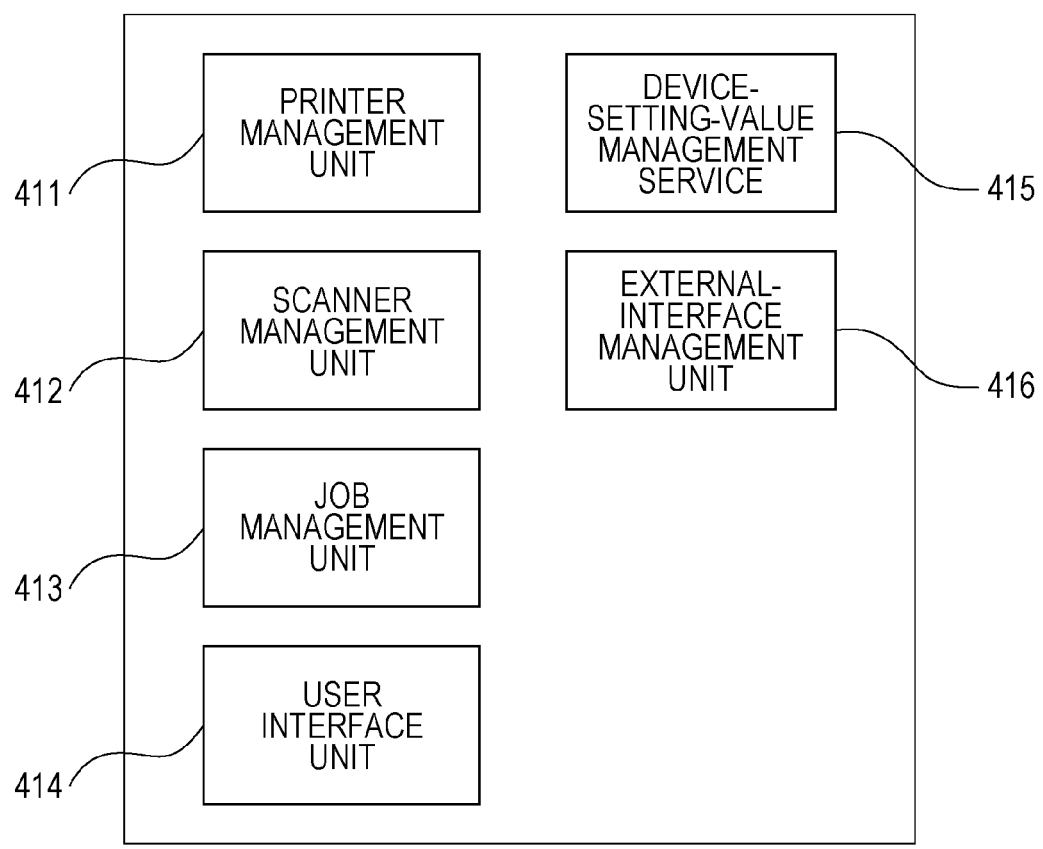
FIG. 4B is a diagram illustrating an example of the software module configuration of the devices.

FIG. 4B is a diagram illustrating an example of the software module configuration of the devices 102 to 104. The software modules of the devices 102 to 104 shown in FIG. 4B are implemented by the CPU 401 reading the software modules from the ROM 402 or the secondary storage 405 into the RAM 403 and executing them.

The software modules of the devices 102 to 104 execute the following processes.

A printer management unit 411 controls printing performed by a printer (not shown) using the printer interface 408.

A scanner management unit 412 controls image reading performed by a scanner (not shown) using the scanner interface 407.

A job management unit 413 controls all of jobs executed by the devices 102 to 104, such as copying, printing, and transmission and reception of a fax.

A user interface unit 414 controls the control panel or the like using the user interface 404.

A device-setting-value management service 415 controls the setting values of the setting items of the devices 102 to 104. The details of the device-setting-value management service will be described later.

An external-interface management unit 416 controls communication with an external device (for example, the server 101) using the network interface 406.

Referring next to the flowcharts in FIG. 5 and FIG. 6, the operation of the device management app and the devices 102 to 104 of the present disclosure will be described.

Figure 5:
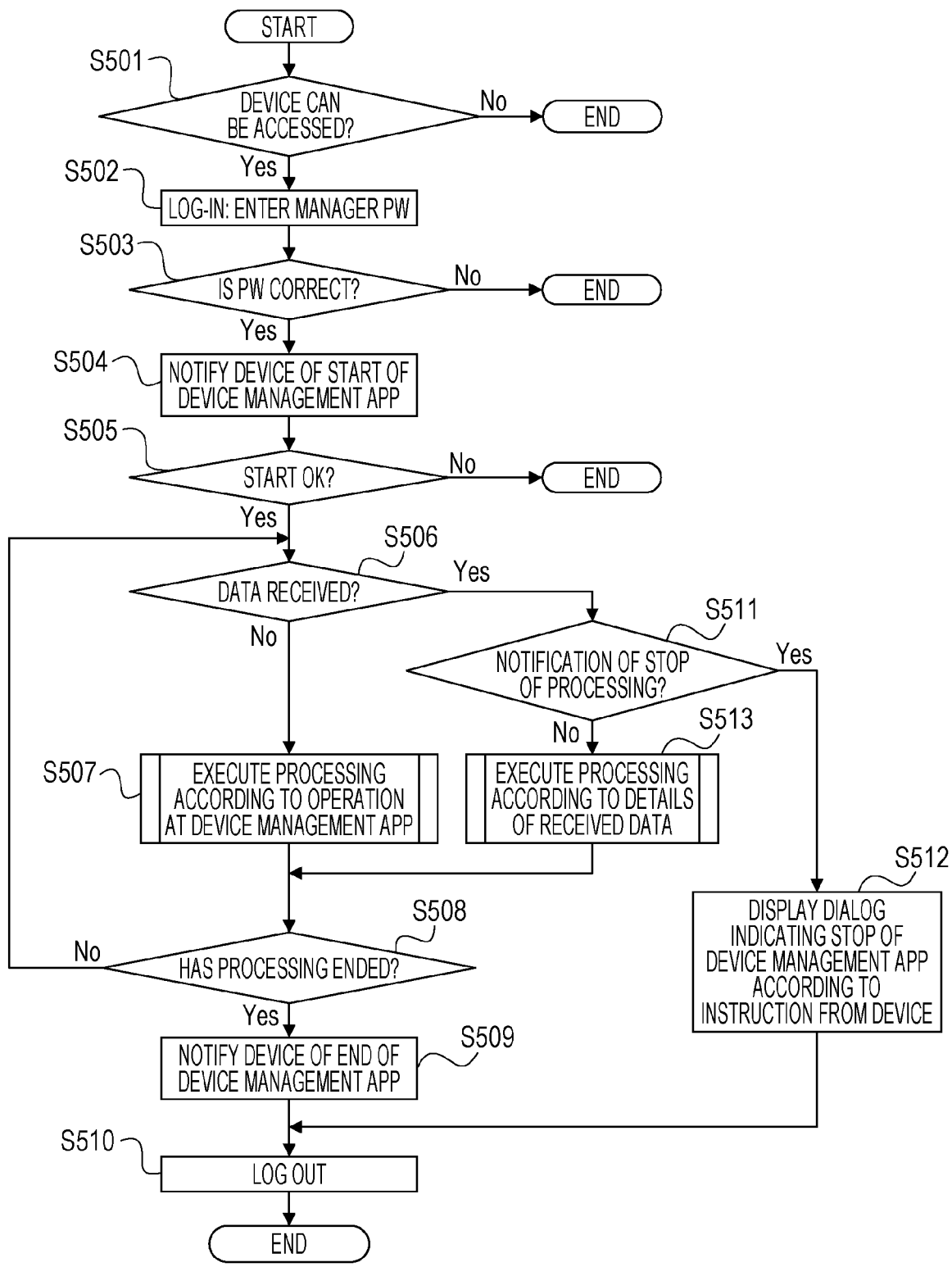
FIG. 5 is a flowchart illustrating an example of processing performed on the device management application side according to a first embodiment.

FIG. 5 is a flowchart illustrating an example of processing performed on the device management application side according to the first embodiment. The operation described in this flowchart is implemented by the CPU 201 of the server 101 executing a program loaded on the RAM 203 from the ROM 202 or the secondary storage 205.

The operations of the subsequent flowcharts are also implemented in the same manner unless otherwise specified.

First, the operation of the device management app will be described.

When the device management app is started by the CPU 201 in the server 101, the device management app determines whether a device to be managed (a target device, one of the devices 102 to 104) can be accessed (S501). At that time, the device search unit 302 searches for a device connected to the network 105 by instructing the network-interface management unit 306 to activate the network interface 206. An example of a specific method of search is specifying the IP address of the target device and determining whether the IP address is connected to the network 105. However, any method may be used to search for the device because a method of device search does not influence the advantageous effects of the present disclosure.

If no target device is found out, the device management app determines that there is no accessible device (S501: No), and ends in error.

In contrast, if a target device is found out, the device management app determines that there is an accessible device (S501: Yes) and proceeds to S502.

At S502, the device management app receives the manager password of the target device as an input to operate the setting items and so on of the target device from the device management app. The password is input by the user interface unit 303 of the server 101 using the user interface 204 and so on. For example, the device management app displays a screen that instructs the user to enter the manager password of the target device on a display (not shown) or the like of the server 101 to prompt the user to enter the manager password using an input device (not shown), such as a keyboard, of the server 101.

Next at S503, the device management app checks whether the input manager password is a correct password. If the manager password is wrong (incorrect) (S503: No), the device management app ends in error. Whether the manager password input at S502 is correct is checked by comparing the password with various pieces of information on the devices 102 to 104 managed by the data management unit 301. Alternatively, the check may be performed by inquiring the target device whether the password input at S502 is correct. Any method of inquiry may be used.

In contrast, if the manager password is correct at S503 (S503: Yes), the device management app proceeds to S504.

At S504, the device management app notifies the target device of the start of the device management app. The notification of the start of the device management app to the target device refers to accessing "device-setting-value management service" executed at the target device from the device management app to connect to the "device-setting-value management service". Any other method may be used to notify the target device of the start of the device management app. The "device-setting-value management service" will be described later.

Next at S505, the device management app determines whether the device management app has been able to notify the target device of the start of the device management app. If the device management app has not been able to notify the target device of the start of the device management app, that is, the device management app could not connect to the "device-setting-value management service" (S505: No), the device management app ends in error.

In contrast, if the device management app has been able to notify the target device of the start of the device management app, that is, the device management app could connect to the "device-setting-value management service" (S505: Yes), the device management app proceeds to S506.

At S506, the device management app determines whether the device management app has received data from the outside. Whether external data has been received is determined by the network-interface management unit 306 using the network interface 206. If the device management app has received external data (S506: Yes), the device management app proceeds to S511. Processing from S511 onward will be described later.

If the device management app has not received external data (S506: No), the device management app proceeds to S507.

At S507, the device management app executes processing according to the operation on the device management app. An example of the processing on the device management app is editing the setting items for the target device displayed on the display of the user interface 204. The editing process allows editing the setting values of the setting items for the target device and transmitting the edited setting values to the device to allow the device to execute setting based on the setting values. The process at S507 will not be described in more detail because it has no influence on the advantageous effect of the present disclosure.

Next at S508, the device management app determines whether the processing at the device management app has ended. An example of the case where the processing at the device management app ends is a case where an operation for terminating the device management app has been performed. If the processing at the device management app has not ended (S508: No), the device management app returns to S506.

In contrast, if the processing at the device management app has ended (S508: Yes), the device management app proceeds to S509.

At S509, the device management app notifies the target device of the end of the device management app. The notification of the end of the device management app to the target device refers to breaking off the connection with the "device-setting-value management service" executed at the target device at S504. The disconnection from the device management app allows the target device to be notified of the end of the device management app.

Next at S510, the device management app is logged out of the device management app. The log-out may be executed as internal processing of the device management app, not processing requested to the user of the device management app, such as the log-in process at S502 and S503.

Next, processing when the device management app has received external data at S506 will be described.

When the device management app has received external data (S506: Yes), the device management app proceeds to S511 to check the received data. If the received data is not a notification of an instruction to stop the device management app from the target device (S511: No), the device management app proceeds to S513. An example of the data that is not a notification of an instruction to stop the device management app is the setting values of the setting items transmitted from the target device to the device management app according to the process of obtaining the setting values of the setting items from the target device executed at S507.

At S513, the device management app executes processing of the device management app according to the details of the data received from the outside and thereafter shifts to S508.

If the received data is a notification of an instruction to stop the device management app, sent from the target device (S511: Yes), the device management app proceeds to S512.

At S512, the device management app displays a dialog indicating the instruction to stop the device management app according to the notification from the device on the display, which is the user interface 204. An image of the dialog indicating that the device management app has been stopped according to the notification from the device is shown in 801 of FIG. 8.

Figure 8:
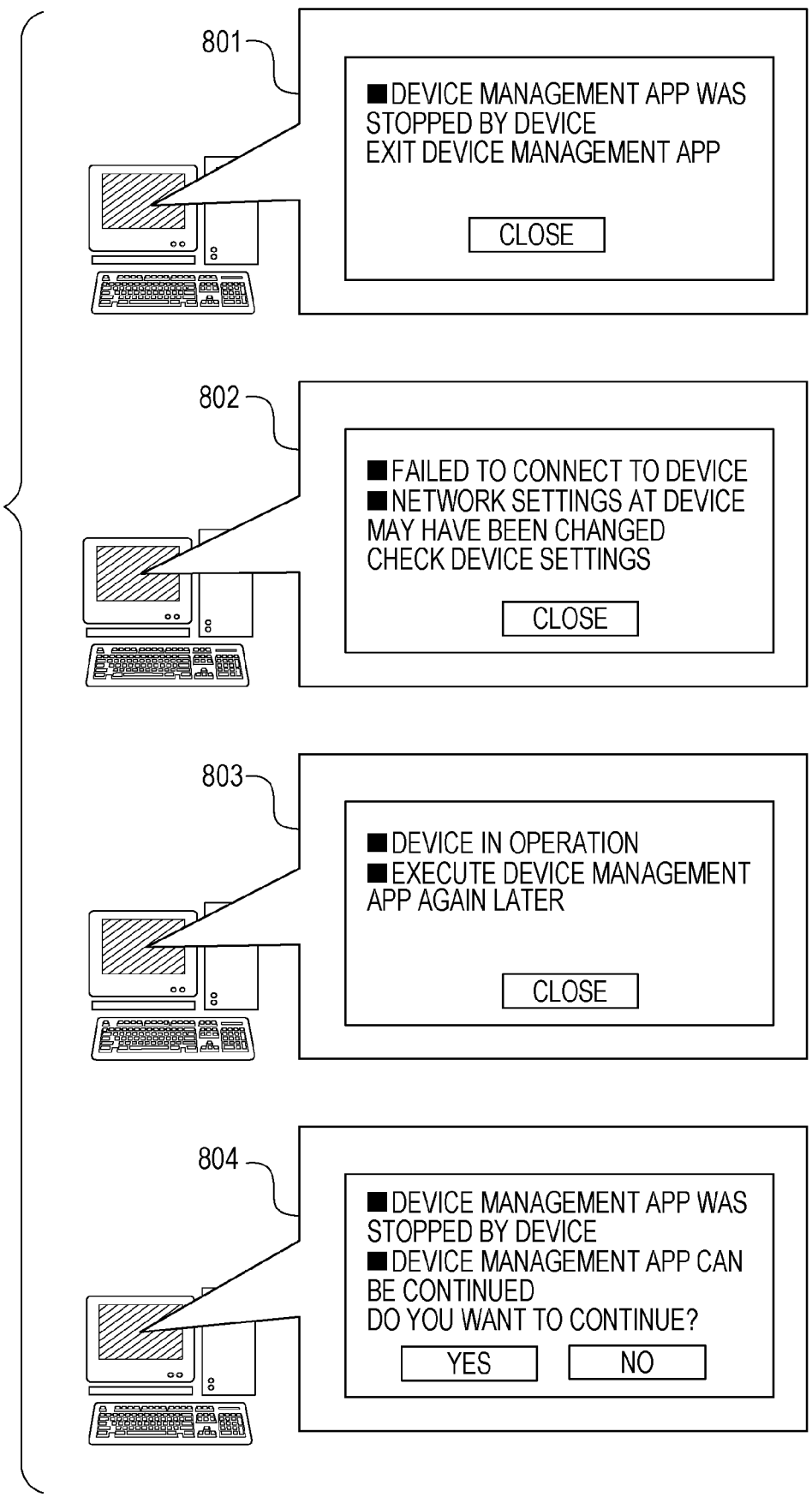
FIG. 8 is a diagram illustrating examples of a screen image displayed by the device management application.

FIG. 8 is a diagram illustrating examples of a screen image displayed by the device management application.

The display as in the dialog 801 allows the device manager to find out that the device management app has been stopped according to the notification from the device.

After displaying the dialog, the device management app proceeds to S510 to force the device management app to log-out. In other words, the device management app is forcedly terminated.

Next, processing at the target device managed by the device management app will be described with reference to the flowchart in FIG. 6.

Figure 6:
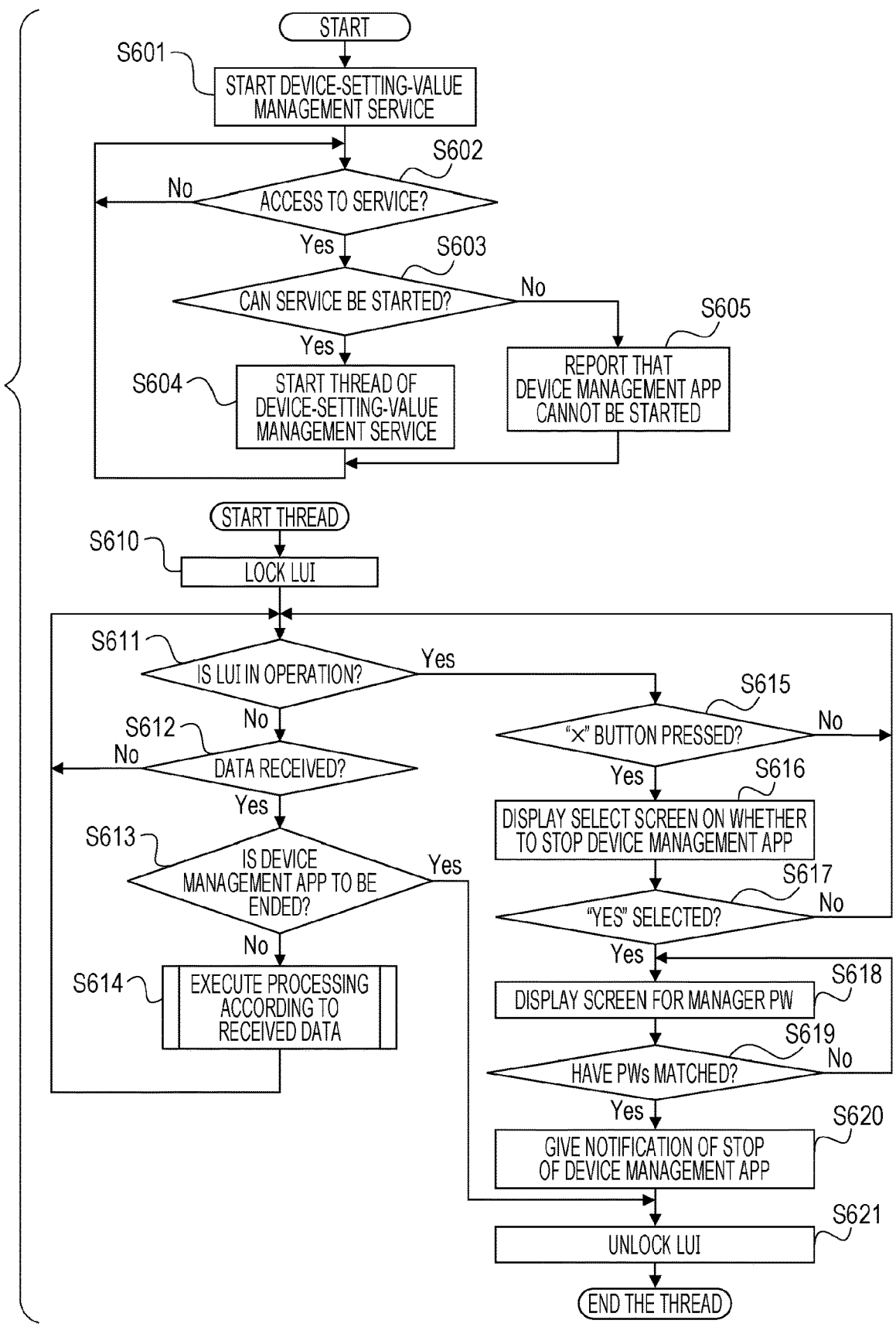
FIG. 6 is a flowchart illustrating an example of processing performed on the device side according to the first embodiment.

FIG. 6 is a flowchart illustrating an example of processing performed on the device side according to the first embodiment. The operation described in this flowchart is implemented by the CPU 401 of each of the devices 102 to 104 executing a program loaded on the RAM 403 from the ROM 402 or the secondary storage 405.

The operations of the subsequent flowcharts are also implemented in the same manner unless otherwise specified.

When the target device is started, the CPU 401 of the device starts a device-setting-value management service (S601). The device-setting-value management service is responsible for changing the setting values of the setting items of the device itself in response to external access or transmitting the setting values of the setting items to the outside. In this embodiment, the device-setting-value management service performs the process of changing the setting values of the setting items of the device and the process of transmitting the setting values to the device management app according to instructions from the device management app. The device-setting-value management service operates independently from the other operations of the device, for example, copying and printing operations.

Next at S602, the device-setting-value management service determines whether the device-setting-value management service is accessed from the outside. Specifically, the access checked at S602 refers to access for connection request from the device management app (corresponding to S504 in FIG. 5). If no access for connection request is given from the device management app (S602: No), the device-setting-value management service continues determination of external access (S602).

In contrast, if access for connection request has been given from the device management app (S602: Yes), the device-setting-value management service proceeds to S603.

At S603, the device-setting-value management service determines whether an actual process of the device-setting-value management service is executable. For example, while some operation is being performed on the control panel of the device, for example, copying, transmitting a fax, or changing the setting values of the setting items of the device, the actual process of the device-setting-value management service cannot be executed. If the actual process of the device-setting-value management service cannot be executed (S603: No), the device-setting-value management service proceeds to S605.

At S605, the device-setting-value management service notifies the device management app that the device-setting-value management service cannot be executed. This causes the device management app not to connect to the "device-setting-value management service" (that is, not to make a notification to start the device management app) and proceeds to end in error from S505 in FIG. 5. After the process of S605, the device-setting-value management service returns to S602.

In contrast, if the actual process of the device-setting-value management service is executable (S603: Yes), the device-setting-value management service proceeds to S604.

At S604, the device-setting-value management service starts a thread that executes an actual process of the device-setting-value management service. The thread refers to processing that can independently operate in parallel with another process of the device. In this embodiment, the processing is described as a thread. Alternatively, a task or a process that can operate in parallel with another process may be employed to execute the device-setting-value management service.

After the process of S604, the device-setting-value management service returns to S602.

Next, the operation of the thread started at step S604 will be described.

When the thread is started, the thread first locks the control panel (hereinafter referred to as "local user interface (LUI)") of the device (S610). The lock is a restricted state in which operations other than a specific operation are not accepted from the control panel. An image of the LUI of the locked device is shown in 701 of FIG. 7.

Figure 7:
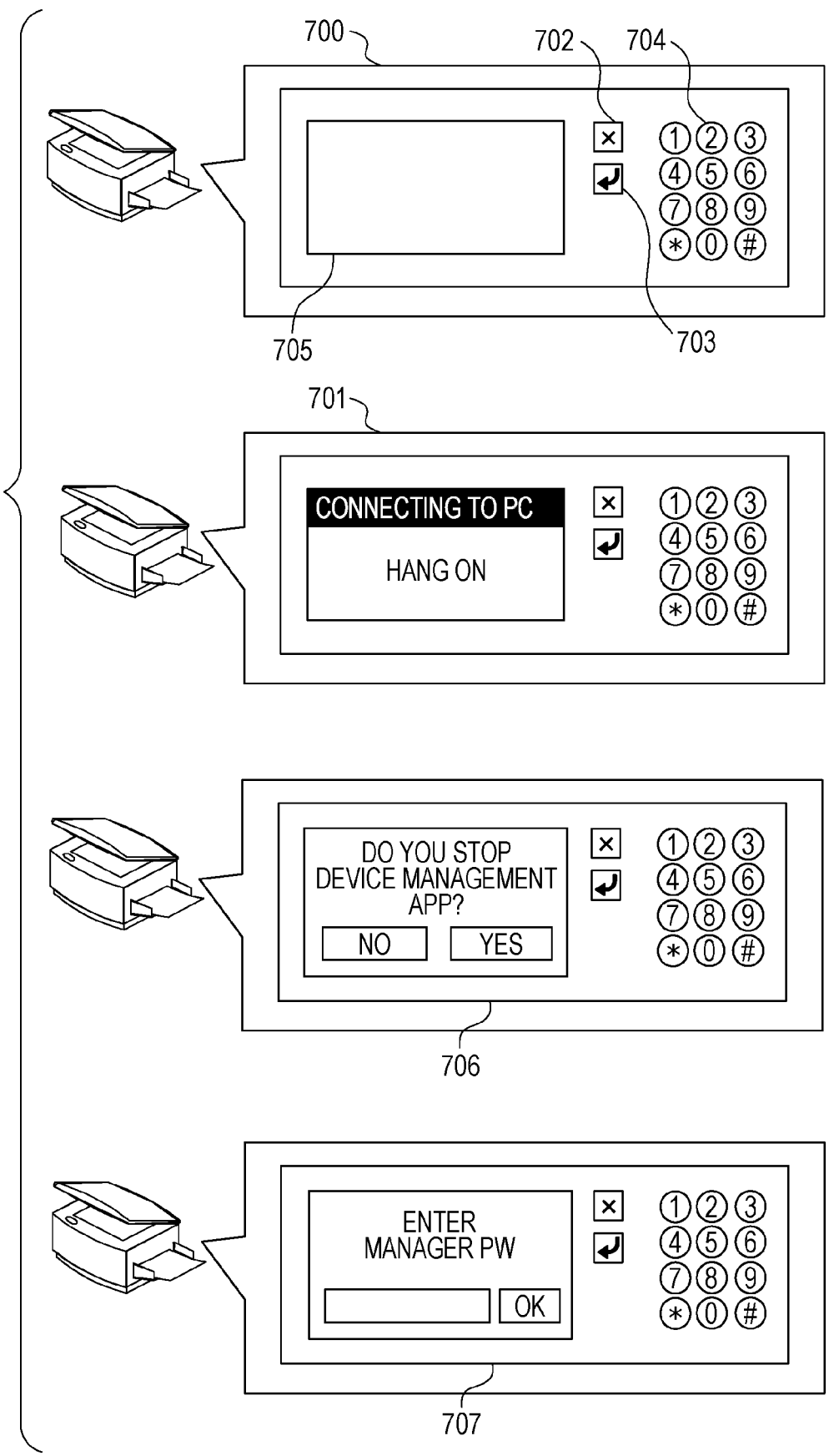
FIG. 7 is a diagram illustrating examples of the image of a control panel of the device.

FIG. 7 is a diagram illustrating examples of the image of the control panel of the device.

The LUI of the locked device becomes unresponsive to operations other than a specific key operation. This disables the user to operate the device directly to execute copying, transmitting a fax, or changing the setting value of the setting item.

Next at S611, the thread determines whether any operation is being performed on the LUI. Specifically, the thread determines whether any of "x" key 702, "Return" key 703, "Numeric keypad" 704, a touch panel display 705 in the image 700 of the LUI in FIG. 7 has been operated. The user interface 404 further includes other keys (not shown), for example, a speaker volume control key and a key for controlling the luminance of the touch panel display 705.

If no operation is performed on the LUI (S611: No), the thread proceeds to S612.

At S612, the thread determines whether external data has been received. If no data has been received (S612: No), the thread returns to S611. The thread is executed in response to a connection request from the device management app (server 101), as described above, only the device management app sends the external data.

In contrast, if external data has been received (S612: Yes), the thread proceeds to S613.

At S613, the thread determines what instruction the data received from the device management app is. If the received data indicates the end of the device management app (S613: Yes), the thread proceeds to S621.

At S621, the thread unlocks the LUI and terminates the "device-setting-value management service" executed in the thread. Since the LUI of the device is unlocked, all of normal operations can be performed. An LUI image at that time is illustrated in 700 of FIG. 7.

In contrast, if the received data is other than data indicating the end of the device management app (S613: No), the thread proceeds to S614.

At S614, the thread executes processing according to the details of the received data. For example, if the data is an instruction to change the setting value of the setting item of the device, the thread changes the setting value of the setting item of the device according to the instruction. If the data is an instruction to transmit the setting value of the setting item of the device using the device management app, the thread performs processing as instructed. Upon completion of the processing according to the instruction from the device management app, the thread returns to S611 from S614.

Next, processing when an operation on the LUI has been performed at S611 will be described.

If an operation on the LUI has been performed (S611: Yes), the thread determines what operation has been performed on the LUI (S615). The LUI of the device includes the touch panel display 705, "Return" key 703 for returning the operation one step, the numerical keypad 704 for use in inputting numerals, and the "x" key 702 for stopping the input operation. At S615, the thread determines whether the "x" key 702 has been operated (pressed). In this embodiment, the "x" key 702 is used for processing branch condition. Alternatively, one of the "Return" key 703 and the numerical keypad 704 may be used for the branch condition.

If the "x" key is pressed at S615 (S615: Yes), the thread proceeds to S616. In contrast, if another operation has been performed (S615: No), the thread returns to S611.

At S616, the thread displays a screen for use in determining whether to stop the device management app on the touch panel display 705 of the LUI. An LUI image at that time is illustrated in 706 of FIG. 7.

Next, at S617, the thread waits until either of the keys "Yes" and "No" on the screen displayed at S616 is pressed. If "No" is pressed (S617: No), the thread returns to step S611.

In contrast, if "Yes" is pressed (S617: Yes), the thread proceeds to S618.

At S618, the thread displays a screen for prompting for the password of the device manager on the touch panel display 705 of the LUI. An LUI image at that time is illustrated in 707 of FIG. 7. This display prompts the user to authenticate the user as the device manager. The authentication need not be performed using the password. For example, authentication using an integrated circuit (IC) card or biological authentication may be used.

Next at S619, the thread waits for the password of the device manager to be input and determines whether the input device manager password is correct. If the input device manager password is incorrect (S619: No), the thread displays a screen for prompting for the device manager password again (S618). It is also possible to stop the entry of the device manager password at S619 to cancel the stop of the device management app. In this case, the thread returns to S611.

In contrast, if the input device manager password is correct (S619: Yes), the thread proceeds to S620.

At S620, the thread notifies the device management app to stop the device management app. The notification to the device management app at S620 is sent to the device management app at S511 of FIG. 5. The notification to the device management app at S620 indicates that data indicating "disconnection" of the "device-setting-value management service" that the device management app connects to is transmitted from the device to the device management app.

After the process of S620, the thread proceeds to S621, at which the thread unlocks the LUI and terminates the "device-setting-value management service" executed in the thread. Since the LUI of the devices is unlocked, all of the normal operations can be performed, as shown in the LUI image 700 in FIG. 7.

The flowcharts of FIGS. 5 and 6 illustrate a configuration for detecting whether a direct operation at the device has become possible after the start of the device management app, depending on whether the device management app connects to the "device-setting-value management service" of the device. In this embodiment, the processing shown in the flowcharts of FIGS. 9 and 10 may be performed, in place of the processing shown in the flowcharts of FIGS. 5 and 6, and has the same advantageous effects. The processing will be described hereinbelow.

Figure 9:
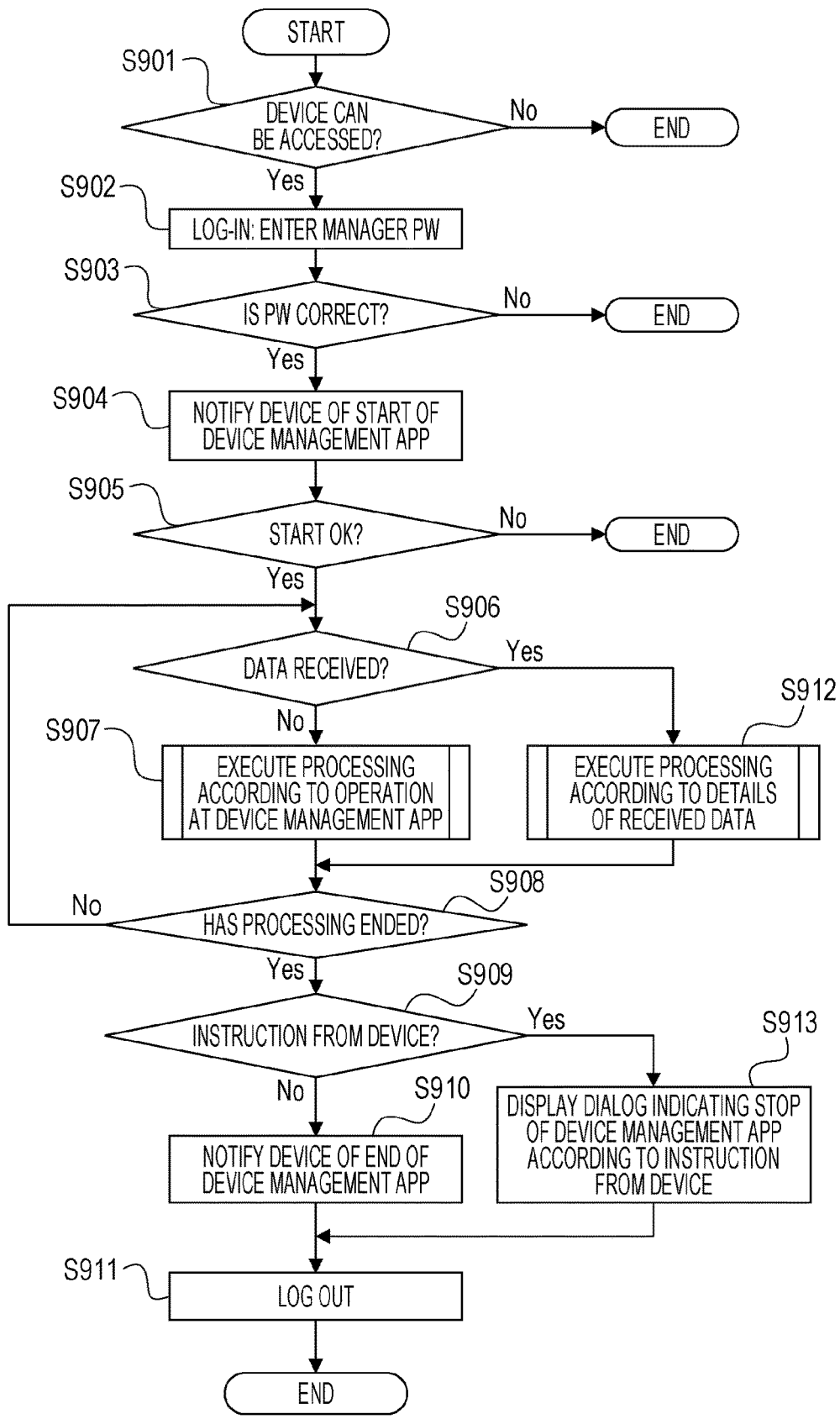
FIG. 9 is a flowchart showing another example of processing performed on the device management application side according to the first embodiment.

FIG. 9 is a flowchart showing another example of processing on the device management application side according to the first embodiment. The operation described in the flowchart is implemented by the CPU 201 of the server 101 executing a program loaded from the ROM 202 or the secondary storage 205 on the RAM 203.

The operations of the subsequent flowcharts are also implemented in the same manner unless otherwise specified.

First, the operation of the device management app will be described.

Since the processing from S901 to S903 in FIG. 9 is the same as that from S501 to S503 in FIG. 5, the description will be omitted.

At S904, the device management app notifies the target device that the device management app is started. Here, a method of operating management information base (MIB) on the device using a simple network management protocol (SNMP) is used. An example of the method is notifying the device of the start of the device management app by writing a value indicating that the device management app is started from the device management app to a specific object on the device side. The SNMP, the MIB, and the object are not particularly described because they are well-known techniques.

Next at S905, the device management app determines whether the start of the device management app has been accepted by the device. The determination at S905 is also performed using the specific MIB object. For example, the device management app waits for the specific object (default value 0x0000) written by the device management app at S904 to be changed on the device side into another value (other than 0x0001). The device management app determines whether the start of the device management app has been accepted (for example, the value changed on the device side has reached 0x1000) or rejected (for example, the value has reached 0xffff) using the value.

If the device has rejected the start of the device management app (S905: No), the device management app ends in error.

In contrast, if the device has accepted the start of the device management app (S905: Yes), the device management app proceeds to S906.

Since the subsequent processing from S906 to S907 is the same as that from S506 to S507 in FIG. 5, the description will be omitted.

If the device management app has received external data as a result of determination at S906 whether the device management app has received external data (S906: Yes), then, at S912, the device management app executes processing according to the received data.

At S908, the device management app determines whether to terminate the device management app according to the operation of the device management app. Furthermore, at S908, the device management app also determines whether to terminate the device management app according to an instruction from the device. The instruction from the device indicates that the monitored specific MIB object of the device indicates that the device management app is to be stopped. In other words, when the device management app is to be stopped by the device, the state of the specific MIB object of the device itself is changed. The monitoring of the state of the specific MIB object of the device performed by the device management app may be performed by another thread or task different from the processing of the flowchart shown in FIG. 9 or may be performed at S908. The monitoring of the state of the object of the device performed by the device management app may be at any timing.

If the device management app is not to be terminated (S908: No), the device management app returns to S906.

In contrast, if the device management app is to be terminated (S908: Yes), the device management app proceeds to S909.

At S909, the device management app determines whether the instruction to terminate the device management app is given from the device or the device management app. If the instruction to terminate the device management app is given from the device (S909: Yes), the device management app proceeds to S913.

At S913, the device management app performs a display indicating that an instruction to terminate the device management app is given from the device, as in 801 of FIG. 8. This is the same processing as at S512 of FIG. 5.

In contrast, if the instruction to terminate the device management app is not given from the device (S909: No), the device management app proceeds to S910.

At S910, the device management app notifies the device of the end of the device management app. This is also performed by writing a value indicating that the device management app has ended from the device management app to a specific MIB object on the device side, as in the processing at S904.

After the processing of S910 or S913, the device management app proceeds to S911.

At S911, the device management app logs out as at S510 of FIG. 5 to terminate the processing of this flowchart.

Next, the processing of the device will be described with reference to the flowchart in FIG. 10.

Figure 10:
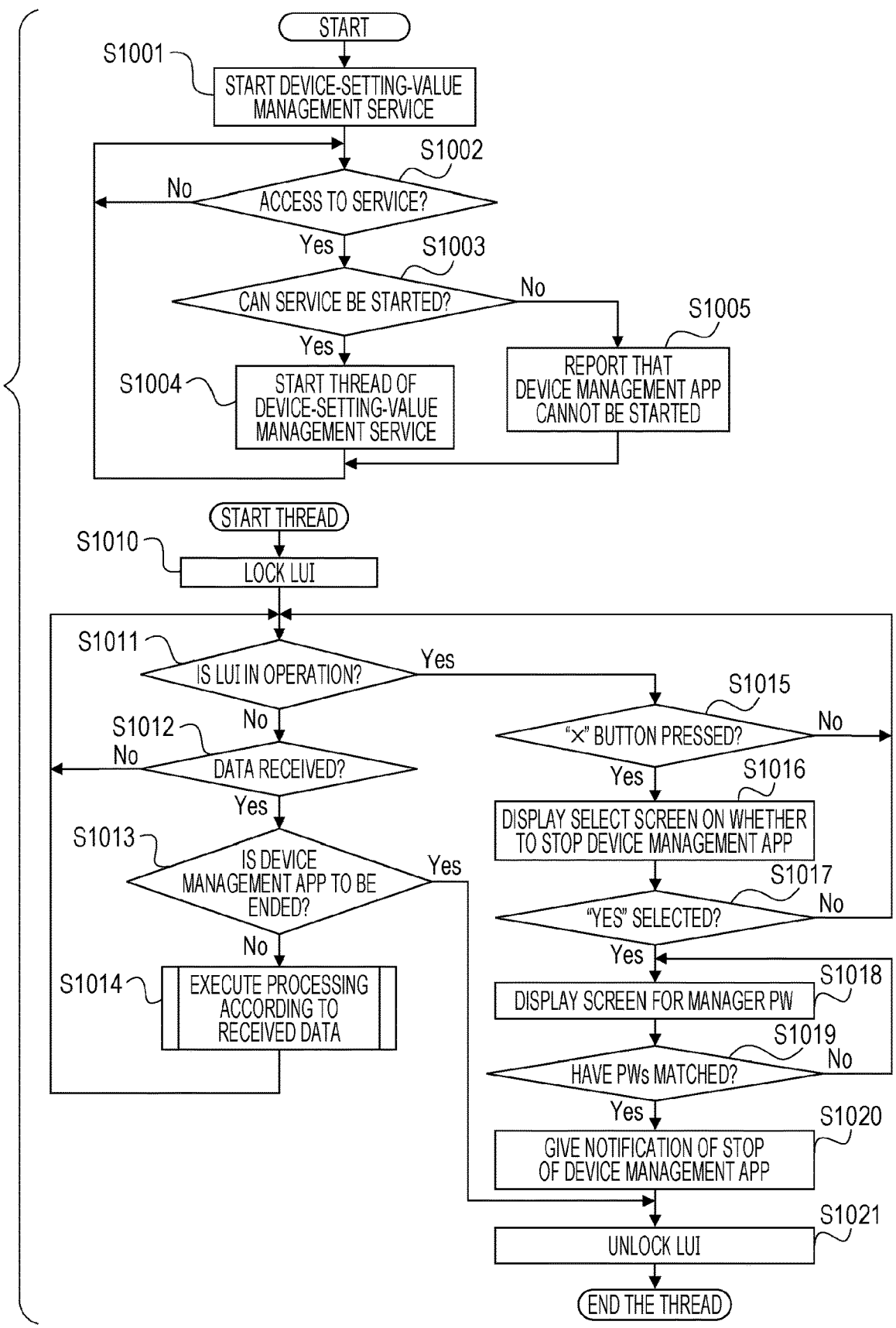
FIG. 10 is a flowchart showing another example of processing performed on the device side according to the first embodiment.

FIG. 10 is a flowchart showing another example of processing performed on the device side according to the first embodiment. The operation described in the flowchart is implemented by the CPU 401 of each of the devices 102 to 104 executing a program loaded from the ROM 402 or the secondary storage 405 on the RAM 403.

The operations of the subsequent flowcharts are also implemented in the same manner unless otherwise specified.

A description of S1001 in FIG. 10 will be omitted because it is the same process as that of S601 in FIG. 6.

At S1002, the device-setting-value management service performs a similar process to that of S602 in FIG. 6 but differs in the method of determining whether the device-setting-value management service is accessed from the outside. At S1002, the device-setting-value management service determines whether a specific MIB object has been changed to a value indicating external access. If the value of the specific MIB object indicates external access (S1002: Yes), the device-setting-value management service proceeds to S1003. The writing to the specific MIB is performed from the device management app (S904 in FIG. 9).

At S1003, the device-setting-value management service performs the same processing as that of S603 in FIG. 6. If the device-setting-value management service determines that the device management app can be started (S1003: Yes), the device-setting-value management service proceeds to S1004. At that time, the device-setting-value management service rewrites the specific MIB object to a value for accepting the start of the device management app.

At S1004, the device-setting-value management service starts a thread that executes an actual process of the device-setting-value management service, as at S604 of FIG. 6, and returns to S1002.

In contrast, if at S1003 it is determined that the device management app cannot be started (S1003: No), the device-setting-value management service proceeds to S1005.

At S1005, the device-setting-value management service rewrites the specific MIB object to a value for rejecting the start of the device management app.

The state of the specific MIB object rewritten at S1004 or S1005 is used in the determination at S905 in FIG. 9.

Next, the processing of the thread of the device-setting-value management service will be described with reference to S1010 to S1021 of the flowchart in FIG. 10. The processing from S1010 to S1021 is basically the same as the processing from S610 to S621 of FIG. 6 but differs in the method for notifying the device management app of the stop of the device management app from the device-setting-value management service (S1020) as follows.

At S1020, the thread rewrites the specific MIB object on the device side to a value indicating the stop of the device management app according to an instruction from the device. This allows the device management app to find out that the device management app is instructed to stop from the device by the determination at S908 of FIG. 9.

Thus, even while the device management app is executed, the target device can be directly operated, and the start of the direction operation of the target device is reported also to the device management app.

Second Embodiment

In the first embodiment, the device management app can find out that it is stopped in response to an instruction from the device. Depending on the subsequent operation on the device side, when the device management app tries to perform some processing on the device (for example, changes the setting value of the setting item) again, the device management app may not be able to connect to the device. An example is a case where the IP address set for the device has been changed by an operation on the device side. When this happens, information on that state may be displayed on the device management app side. This embodiment will be described hereinbelow.

The specific operation of this embodiment will be described with reference to the flowcharts in FIG. 5 and FIG. 9.

As in the first embodiment, the operation described in this flowchart is implemented by the CPU 201 of the server 101 executing a program loaded on the RAM 203 from the ROM 202 or the secondary storage 205.

At S501 of FIG. 5 and S901 of FIG. 9, the device management app determines whether the target device (102 to 104) can be accessed using the IP address or the like of the device, stored in the device management app. If the device can be accessed (Yes), the process proceeds to the next step (S502 or S902). If the device cannot be accessed (No), the device management app ends in error. At that time, the device management app displays a dialog like 802 of FIG. 8 on the display serving as the user interface 204.

Thus, this makes it easy to assume the cause of connection failure when the device is directly operated during the execution of the device management app and then the device management app tries to connect to the device again, as described above.

Third Embodiment

In the first embodiment, the device management app can be stopped according to an instruction from the device. Some operation may be executed on the device side with high possibility. For that reason, the operation executed in the device may be given priority over the device management app started again according to an instruction from the device. This embodiment will be described hereinbelow.

The specific operation of this embodiment will be described with reference to the flowchart of FIG. 11.

Figure 11:
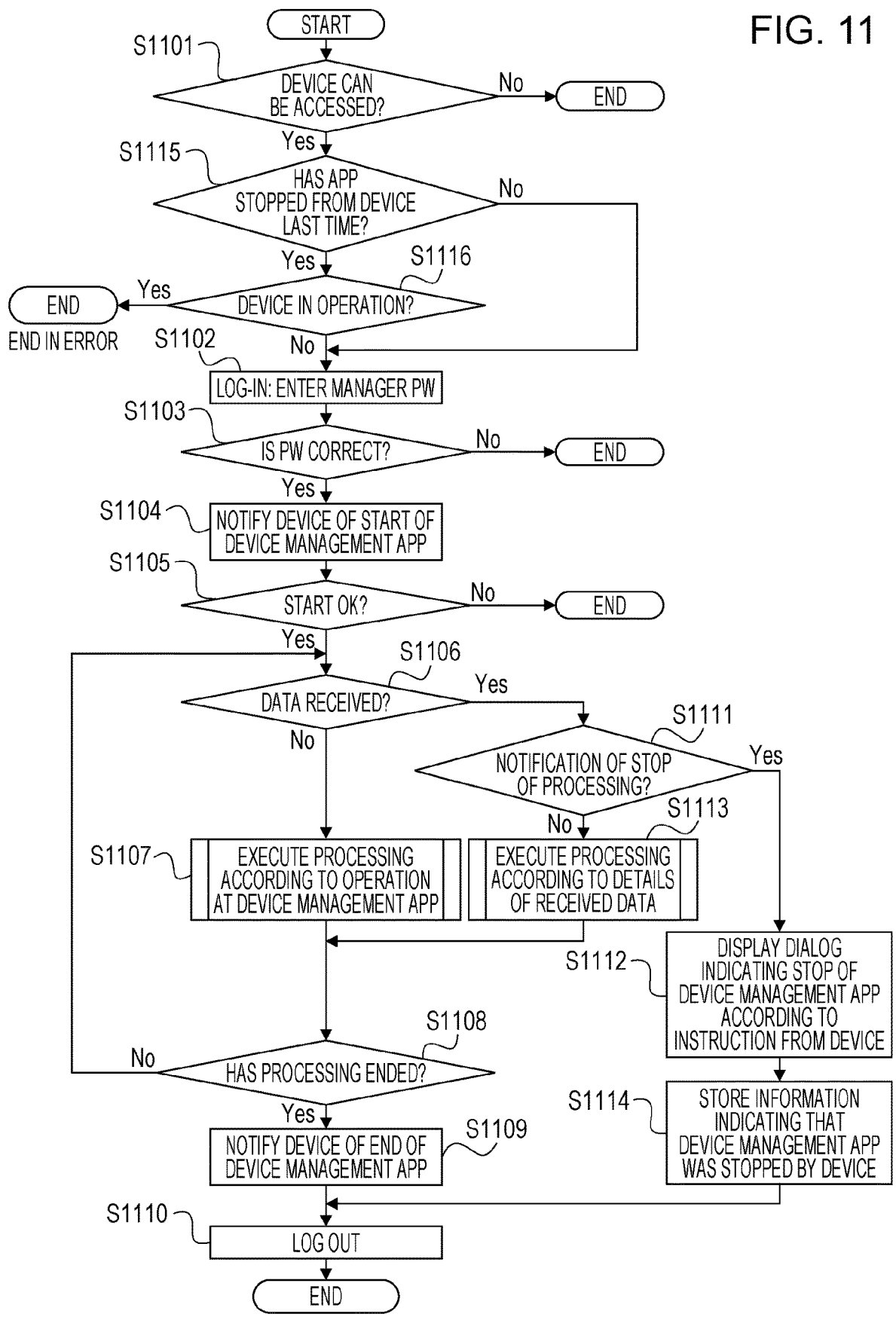
FIG. 11 is a flowchart illustrating an example of processing performed on the device management application side according to a third embodiment.

FIG. 11 is a flowchart illustrating an example of processing performed by the device management application according to the third embodiment. As in the first embodiment, the operation described in this flowchart is implemented by the CPU 201 of the server 101 executing a program loaded on the RAM 203 from the ROM 202 or the secondary storage 205. Processing performed by each of the devices 102 to 104 is implemented by the CPU 401 of the device executing a program loaded on the RAM 403 from the ROM 402 or the secondary storage 405.

The processing from S1101 to S1113 of FIG. 11 is the same as the processing from S501 to S513 of FIG. 5 or may the same as the processing from S901 to S913 in FIG. 9. In this embodiment, the processing from S1115 to S1116 is added between the processing from S501 to S502 or the processing from S901 to S902, and S1114 is added directly after S512 or S913.

First at S1114, the data management unit 301 of the device management app stores information indicating that the device management app is stopped according to an instruction from the device in the RAM 203 or the secondary storage 205. For example, the device management app changes information, which is initialized to "0x00" when the device management app is started, to "0x01" and stores it in the RAM 203 or the secondary storage 205. This information may be deleted after the passage of a predetermined time (that can be set by the manager or the like).

If at S1101 it is determined that the device can be accessed, then the device management app proceeds to S1115.

At S1115, the device management app determines whether the device management app was stopped directly before (last time) according to an instruction from the device using the information stored at S1114. If the device management app has been stopped under the instruction from the device, the information stored at S1114 is "0x01". In that case, the device management app determines that the result is Yes at S1115 and proceeds to S1116.

At S1116, the device management app determines if an operation on the LUI of the device has been performed or ended. When an operation on the LUI has not been performed for a given period of time, or a specific key, such as "x" key 702, was pressed to complete an operation on the LUI, the device shows it to the outside by rewriting the specific MIB object. In other words, at S1116, the device management app can find out that the operation on the LUI of the device has been completed by monitoring the specific MIB object.

For example, when an operation on the LUI has not been performed on the device side for a given period of time, the value of the specific MIB object that the device management app monitors reaches "0x4000", and the operation on the LUI has been completed, the value of the specific MIB object reaches "0x8000". The specific MIB object that the device management app monitors of course changes to various values other than the above values depending on the state of the device.

If at S1116 the device management app finds out that the operation on the LUI of the device has not been completed (in operation) (Yes), then the device management app provides a dialog, such as 803 in FIG. 8, on the display serving as the user interface 204 and ends in error.

In contrast, if at S1116 it is found out that the operation on the LUI of the device has been completed (No), then the device management app proceeds to S1102 and initializes the information stored at S1114 (returns the value to "0x00").

If at S1115 the device management app has not been stopped according to an instruction from the device (No), the device management app proceeds to S1102 and executes the subsequent processing.

Thus, when the device management app is stopped according to an instruction from the device and is then executed again, the device management app does not interrupt an operation that is continuing at the device until the operation is completed.

Fourth Embodiment

In the first to third embodiments, no special processing is executed when the device management app is to be stopped according to an instruction from the device. Alternatively, the device management app may reconfirm the stop of the device management app.

Specifically, before the device management app starts the log-out at S510 of FIG. 5, S911 of FIG. 9, or S1110 of FIG. 11, the device management app displays a dialog like 804 of FIG. 8.

The dialog 804 displays a message that the device management app is stopped according to an instruction from the device and options so that the user can select whether to start the device management app again.

If "Yes" (starting the device management app) is selected on the dialog 804, the device management app proceeds to S504 of FIG. 5, S904 of FIG. 9, or S1104 of FIG. 11 to continue the device management app.

In contrast, if "No" is selected on the dialog 804, the device management app performs log-out at S510 of FIG. 5, S911 of FIG. 9, or S1110 of FIG. 11.

Thus, enabling the device management app to be continued when the device management app is to be stopped according to an instruction from the device eliminates the need for additional processing, such as re-login.

Fifth Embodiment

In the fourth embodiment, in stopping the device management app, the device management app determines again whether to stop the device management app. In addition, the device itself may wait for the restart of the device management app, with the LUI of the device locked.

The operation of this embodiment will be described with reference to the flowcharts of FIG. 12 and FIG. 13 and so on.

Figure 12:
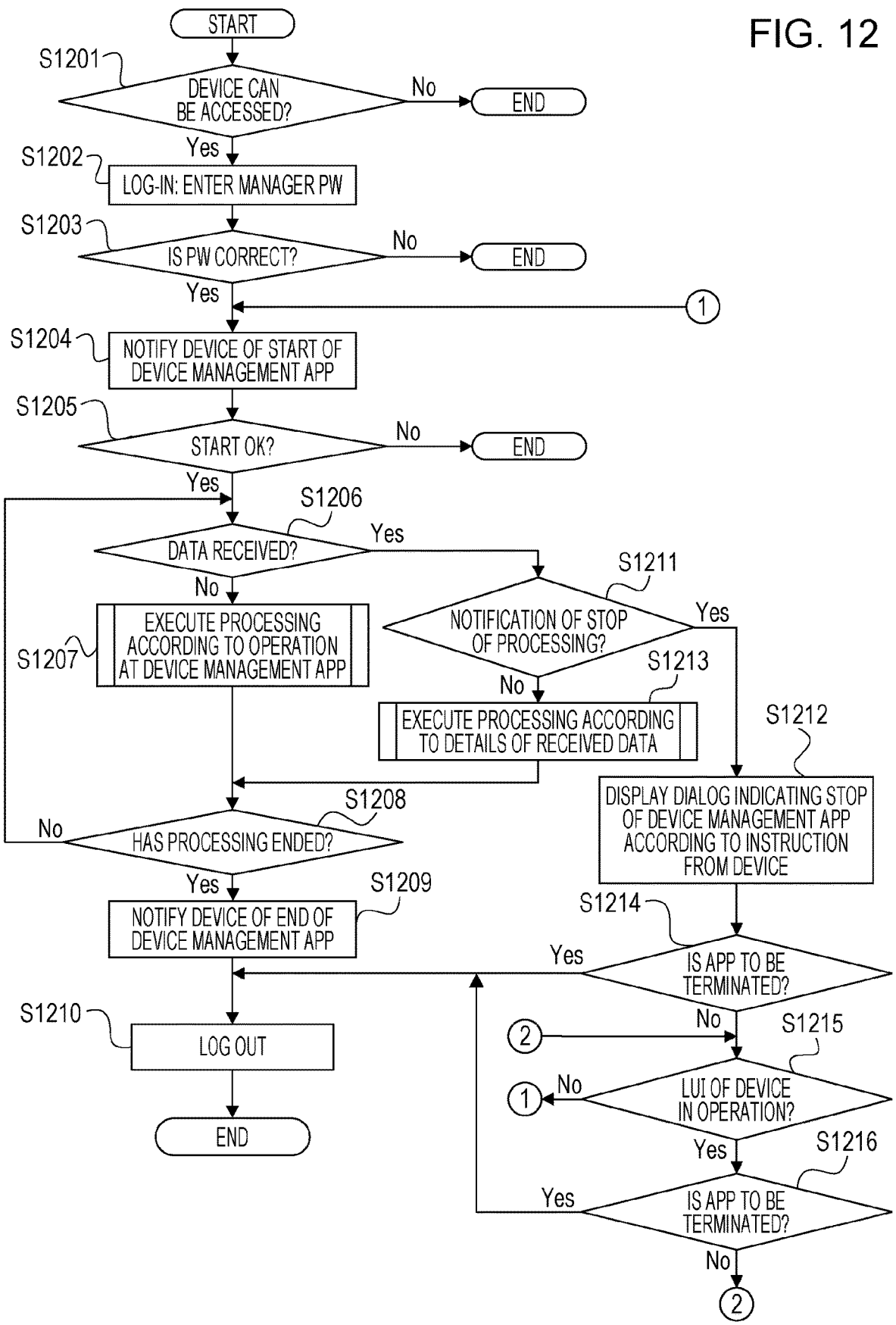
FIG. 12 is a flowchart illustrating an example of processing performed on the device management application side according to a fifth embodiment.

FIG. 12 is a flowchart illustrating an example of processing performed by the device management application according to the fifth embodiment. The operation described in this flowchart is implemented by the CPU 201 of the server 101 executing a program loaded on the RAM 203 from the ROM 202 or the secondary storage 205.

A description of the processing from S1201 to S1213 in FIG. 12 will be omitted because it is the same processing as the processing from S501 to S513 in FIG. 5.

In the fifth embodiment, the device management app displays, at S1212, a dialog (804 in FIG. 8) indicating that the device management app is stopped from the device and proceeds to S1214.

At S1214, the device management app determines whether "Yes" has been pressed on the dialog (804 in FIG. 8) displayed at S1212. If "No" has been pressed, the device management app determines to terminate the device management app (S1214: Yes) and proceeds to S1210 to terminate the device management app.

In contrast, if it is determined that "Yes" has been pressed, then the device management app determines not to terminate the device management app (S1214: No) and proceeds to S1215.

At S1215, the device management app determines whether on operation on the LUI of the device has been completed. If the operation on the LUI has been completed (S1215: No), the device management app returns to S1204 to perform the processing of the device management app. In contrast, the operation on the LUI has not been completed (S1215: Yes), the device management app proceeds to S1216.

Figure 14:
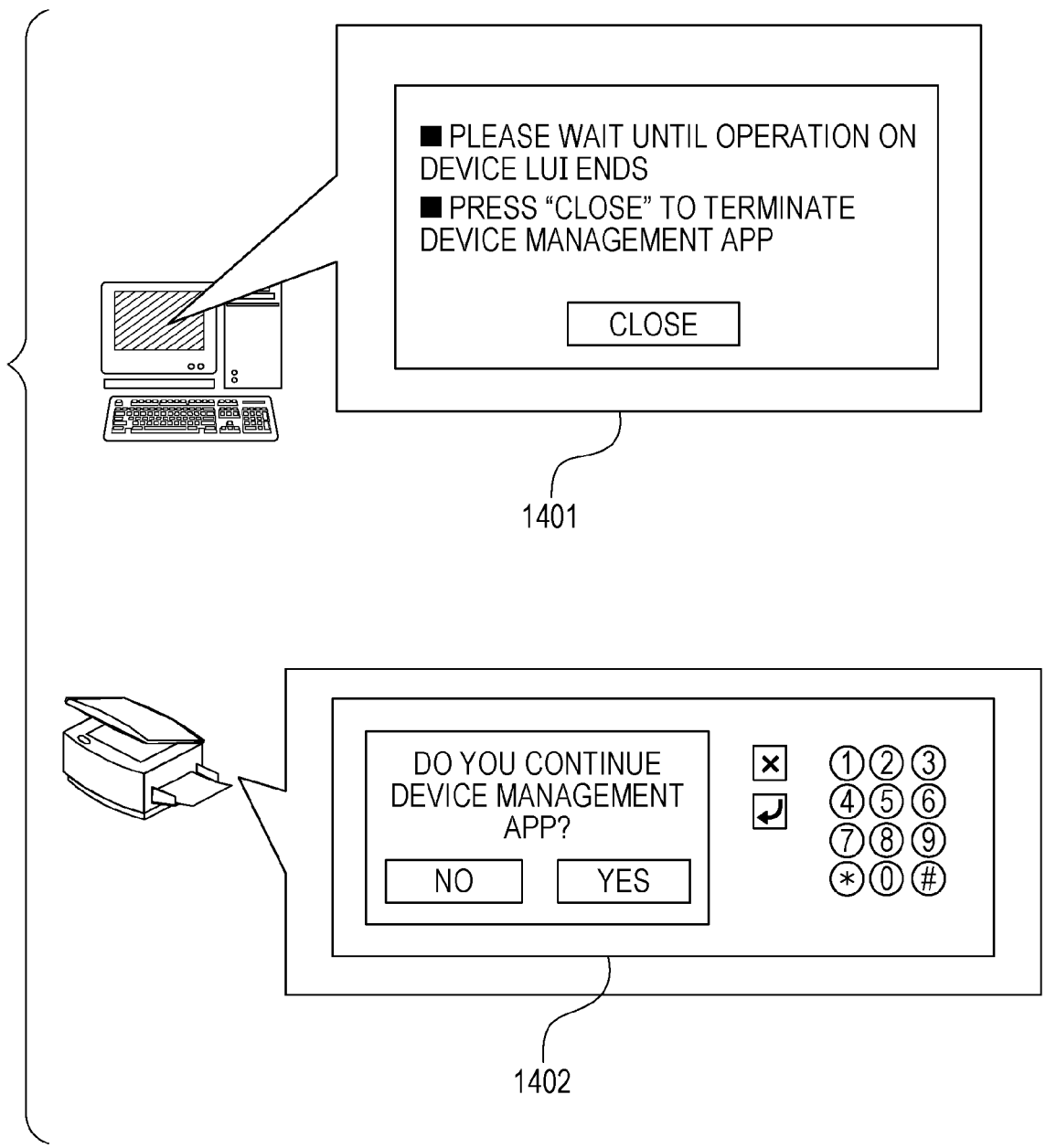
FIG. 14 is a diagram illustrating screen images displayed on the device management application and the device according to the fifth embodiment.

At S1216, the device management app displays a dialog like 1401 in FIG. 14 to restrict a user operation and determines whether to terminate the device management app before the operation on the LUI of the device ends.

FIG. 14 is a diagram illustrating screen images displayed on the device management application and the device according to the fifth embodiment.

If "Close" is pressed while the dialog 1401 is displayed, the device management app determines to terminate the device management app (S1216: Yes) and proceeds to S1210 to terminate the device management app.

In contrast, if "Close" has not been pressed while the dialog 1401 is displayed, the device management app determines to continue the device management app (S1216: No) and returns to S1215 while displaying the dialog 1401. The device management app waits for completion of the operation on the LUI of the device. Thereafter, if the operation on the LUI has been completed (S1215: No), the device management app closes the dialog 1401 to withdraw the restriction on user operation, described above, and returns to S1204.

Next the operation of the device according to this embodiment will be described with reference to the flowcharts of FIG. 6, FIG. 10, and FIG. 13.

First, in the process of stopping the device management app according to an instruction from the device, such as S620 of FIGS. 6 and S1020 of FIG. 10, information indicating that the device management app has been stopped under the instruction from the device is stored in the RAM 403 or the secondary storage 405 of the device.

Next, the flowchart of FIG. 13 will be described.

Figure 13:
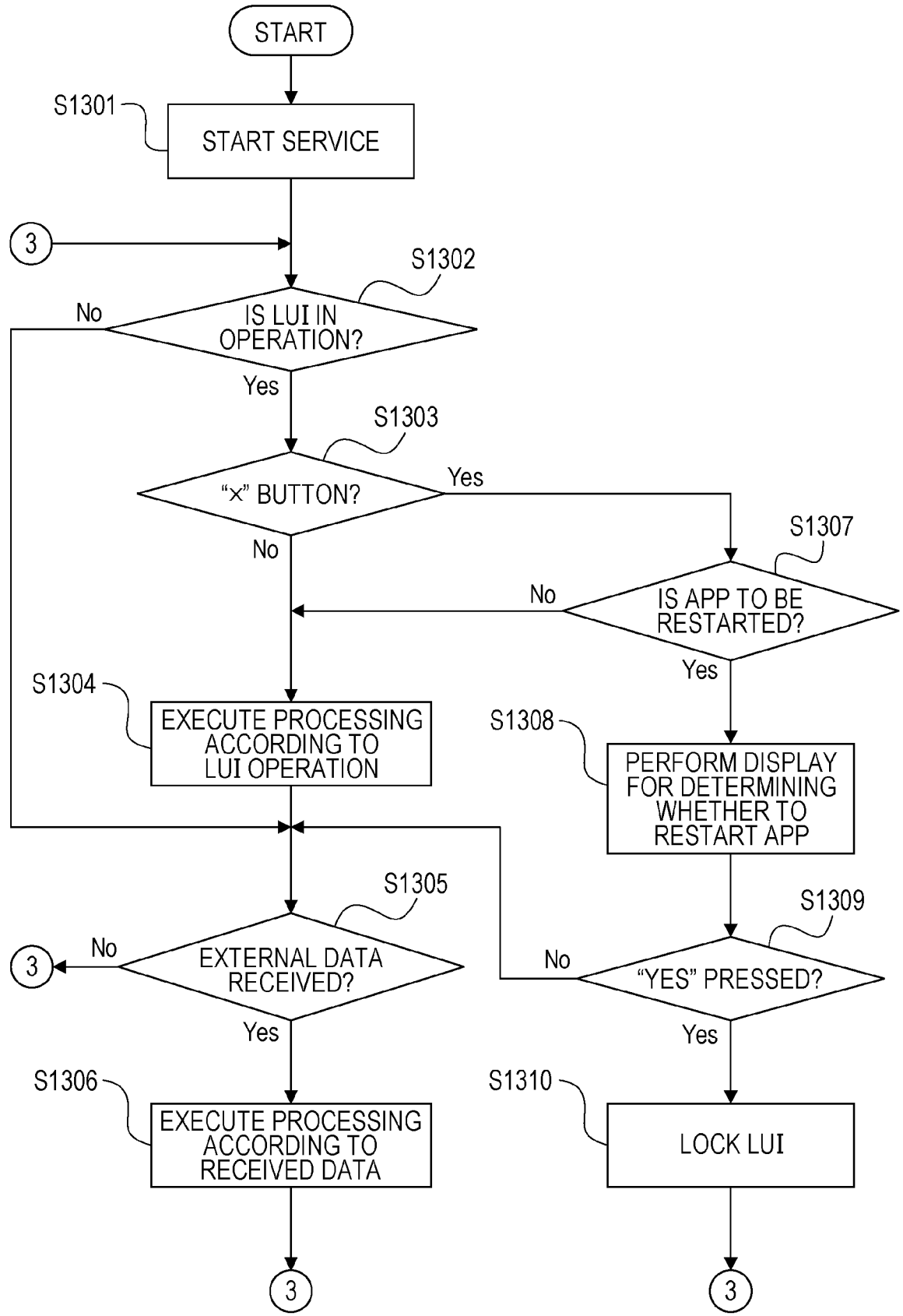
FIG. 13 is a flowchart illustrating processing performed on the device side according to the fifth embodiment.

FIG. 13 is a flowchart illustrating processing performed by the device according to the fifth embodiment. The operation described in this flowchart is implemented by the CPU 401 of each of the devices 102 to 104 executing a program loaded on the RAM 403 from the ROM 402 or the secondary storage 405.

First, when the device is started, the CPU 401 of the device (hereinafter simply referred to as "CPU 401") starts a service to be executed by the device, such as a device-setting-value management service (S1301). An example is the process of S601 in FIG. 6. In other words, the operation illustrated in FIG. 13 is performed in parallel to the processing from S602 to S604 in FIG. 6.

Next at S1302, the CPU 401 determines whether some operation is being performed on the LUI of the device. If no operation is performed on the LUI (S1302: No), the CPU 401 proceeds to S1305. If some operation is being performed on the LUI (S1302: Yes), the CPU 401 proceeds to S1303.

At S1303, the CPU 401 determines whether the operation on the LUI is a press on the "x" key 702. If it is not the "x" key 702 (S1303: No), the CPU 401 proceeds to S1304.

At S1304, the CPU 401 executes processing according to the operation on the LUI and proceeds to S1305.

If the "x" key 702 has been pressed (S1303: Yes), the CPU 401 proceeds to S1307.

At S1307, the CPU 401 determines whether to need to determine whether to restart the device management app. The determination at S1307 is performed according to information indicating that the device management app has been stopped in response to an instruction from the device, stored in the RAM 403 or the secondary storage 405 described above. If information indicating that the device management app has been stopped in response to the instruction from the device, then the CPU 401 determines that there is no need to determine whether to restart the device management app (S1307: No) and proceeds to S1304. The CPU 401 performs normal processing when the "x" key 702 is pressed.

In contrast, information indicating that the device management app has been stopped according to an instruction from the device, the CPU 401 determines that it is necessary to determine whether to restart the device management app (S1307: Yes) and proceeds to S1308.

At S1308, the CPU 401 gives a display as shown in 1402 of FIG. 14 on the touch panel display 705 of the LUI and proceeds to S1309.

At S1309, the CPU 401 determines whether to restart the device management app. In other words, if "Yes" is pressed on the touch panel display 705 (S1309: Yes), the CPU 401 proceeds to S1310. At S1310, the CPU 401 waits for the restart of the device management app by locking the LUI again and returns to S1302.

In contrast, "No" is pressed on the touch panel display 705 (S1309: No), the CPU 401 proceeds to S1305.

At S1305, the CPU 401 determines whether external data has been transmitted to the device. If no external data has been transmitted to the device (S1305: No), the CPU 401 returns to S1302.

In contrast, if external data has been transmitted (S1305: Yes), the CPU 401 performs processing according to the data (S1306) and returns to S1302.

Thus, locking the LUI by the device itself after completion of the operation on the LUI enables the device management app to be continuously executed without the device being operated by a user other than the device manager.

If No at S1214, a message not to terminate the device management app may be transmitted to the device. In this case, the device management app does not restrict the user operation at the device management app. The device, which has received the notification, provides a display indicating that the stop is rejected by the device management app so as not to unlock the control panel.

The above embodiments have the advantageous effect of unlocking the device so that the device can be directly operated even if the device manager is using the device management application and notifying the device management application that the device is directly operated.

It is to be understood that the configuration and the details of various data are given for mere illustrative purposes and various configuration and details are possible depending on the application and purpose.

Having described the embodiments, the present disclosure may be embodied as, for example, a system, an apparatus, a method, a program, or a storage medium. Specifically, the present disclosure may be applied to a system including a plurality of devices or an apparatus composed of a single device.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-170890, filed Oct. 9, 2020 which is hereby incorporated by reference herein in its entirety.

What is claimed is:

1. A system comprising:

a device including an operation unit; and an information processing apparatus that executes an application program for changing setting of the device according to an operation of a user, wherein the device includes:

at least one first memory that stores instructions; and at least one first processor that executes the instructions to perform:

restricting an operation via the operation unit in response to connection from the application program; and transmitting a first notification, to the application program, for stopping processing for changing the setting of the device according to the application program and withdrawing the restriction when receiving an operation for withdrawing the restriction via the operation unit, and wherein the information processing apparatus includes:

at least one second memory that stores the application program; and at least one second processor that executes the application program to perform:
controlling connection to the device; and
stopping the processing for changing the setting of the device according to the application program when receiving the first notification from the device, and
wherein the operation for withdrawing the restriction includes an operation on a specific key of the operation unit and an operation for authenticating a device manager.

2. The system according to claim 1, wherein, when receiving the first notification from the device, the information processing apparatus notifies the user that the processing for changing the setting of the device according to the application program is stopped from the device to terminate the application program.

3. The system according to claim 1, wherein, when the information processing apparatus cannot communicate with the device in a case where the application program is terminated in response to the first notification from the device and thereafter restarted, the information processing apparatus notifies the user that the setting of the device may have been changed.

4. The system according to claim 1, wherein, when the application program is terminated in response to the first notification from the device and thereafter restarted, the information processing apparatus communicates with the device to determine whether the operation unit is being operated, wherein when the operation unit is in operation, the information processing apparatus terminates the application program.

5. The system according to claim 4, wherein, when terminating the application program while the operation unit is in operation, the information processing apparatus notifies the user that the operation unit is in operation.

6. The system according to claim 1,
wherein, when receiving an operation for not terminating the application program from the user when receiving the first notification from the device, the information processing apparatus continues execution of the application program and restricts an operation on the application program from the user until the operation on the operation unit of the device ends, and
wherein, when receiving an operation for restricting an operation on the operation unit via the operation unit after restriction on the operation unit is withdrawn by an operation for withdrawing the restriction on the operation unit, the device restricts an operation via the operation unit.

7. The system according to claim 1,
wherein, when receiving an operation for not terminating the application program from the user when receiving the first notification from the device, the information processing apparatus continues execution of the application program and transmits a second notification that the execution of the application program is to be continued to the device, and
wherein, when receiving the second notification from the application program even when transmitting the first notification to the application program, the device does not withdraw the restriction on the operation unit.

8. The system according to claim 1, wherein the device comprises an image forming apparatus.

9. A device configured to edit a setting value of the device according to instructions from an application program operating in an information processing apparatus, the device comprising:
at least one memory that stores instructions; and
at least one processor that executes the instructions to perform:
restricting an operation via an operation unit of the device in response to connection from the application program; and
transmitting a first notification to the application program for stopping processing for changing the setting of the device according to the application program and withdrawing the restriction when receiving an operation for withdrawing the restriction via the operation unit,
wherein the operation for withdrawing the restriction includes an operation on a specific key of the operation unit and an operation for authenticating a device manager.

10. A method for controlling a device configured to edit a setting value of the device according to instructions from an application program operating in an information processing apparatus, the method comprising:
restricting an operation via an operation unit of the device in response to connection from the application program; and
transmitting a first notification, to the application program, for stopping processing for changing the setting of the device according to the application program and withdrawing the restriction when receiving an operation for withdrawing the restriction via the operation unit,
wherein the operation for withdrawing the restriction includes an operation on a specific key of the operation unit and an operation for authenticating a device manager.

11. A non-transitory computer readable storage medium storing a program for causing a processor of a device to perform:
restricting an operation via an operation unit of the device in response to connection from an application program operating in an information processing apparatus;
editing a setting value of the device according to instructions from the application program operating in the information processing apparatus; and
transmitting a first notification, to the application program, for stopping processing for changing setting of the device according to the application program and withdrawing the restriction when receiving an operation for withdrawing the restriction via the operation unit,
wherein the operation for withdrawing the restriction includes an operation on a specific key of the operation unit and an operation for authenticating a device manager.

* * * * *